(12) United States Patent
Kozina et al.

(10) Patent No.: US 9,906,619 B2
(45) Date of Patent: Feb. 27, 2018

(54) METHOD, SYSTEM, AND COMPUTER PROGRAM PRODUCT TO UPDATE CONTENT ON NETWORKED CACHE SERVERS

(71) Applicant: International Business Machines Corporation, Armonk, NY (US)

(72) Inventors: Gerald E. Kozina, Cupertino, CA (US); Yongliang Li, Beijing (CN); Masoud Madani, Costa Mesa, CA (US); George F. Silva, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 14/807,811

(22) Filed: Jul. 23, 2015

(65) Prior Publication Data

US 2017/0026484 A1 Jan. 26, 2017

(51) Int. Cl.
*G06F 15/16* (2006.01)
*H04L 29/08* (2006.01)

(52) U.S. Cl.
CPC ...... *H04L 67/2852* (2013.01); *H04L 67/1097* (2013.01)

(58) Field of Classification Search
CPC .............................. H04L 67/10; H04L 67/28
USPC ......................................................... 709/213
See application file for complete search history.

(56) References Cited

U.S. PATENT DOCUMENTS

| | | | |
|---|---|---|---|
| 5,940,594 A | 8/1999 | Ali et al. | |
| 7,552,220 B2 | 6/2009 | Marmigere | |
| 7,904,562 B2 | 3/2011 | Takase et al. | |
| 8,204,930 B1* | 6/2012 | Kee | H04L 69/28 709/203 |
| 2004/0254933 A1* | 12/2004 | Ho | G06F 17/30362 |
| 2007/0124309 A1 | 5/2007 | Takase et al. | |
| 2008/0034031 A1* | 2/2008 | Weisbrot | G06F 17/30902 709/203 |
| 2013/0086323 A1 | 4/2013 | Kadlabalu | |
| 2013/0246498 A1* | 9/2013 | Zucknovich | H04L 67/2842 709/201 |
| 2014/0075109 A1 | 3/2014 | Richardson et al. | |

FOREIGN PATENT DOCUMENTS

WO 200739576 4/2007

* cited by examiner

*Primary Examiner* — Glenford Madamba
(74) *Attorney, Agent, or Firm* — Rabindranath Dutta; Konrad, Raynes, Davda and Victor LLP (57) ABSTRACT

A controller receives a request from a user to store content in a target node of a plurality of nodes. A determination is made of a preferred node for the user, from a repository that maintains a correspondence between the user and the preferred node for storing the content for the user, wherein the preferred node is included in the plurality of nodes. Responsive to determining from that the determined preferred node is the target node, the controller transmits the request from the user to store the content, to the preferred node. Responsive to determining that the determined preferred node is not the target node, the controller transmits the request and an identification of the target node to the preferred node.

18 Claims, 8 Drawing Sheets

METHOD, SYSTEM, AND COMPUTER PROGRAM PRODUCT TO UPDATE CONTENT ON NETWORKED CACHE SERVERS

BACKGROUND

1. Field

Embodiments relate to the updating of content on networked cache servers.

2. Background

In content management systems, a cache server may be used to store temporary content that had been fetched from remote servers. In certain situations, a cache server is defined and a group of users are defined to be close to this cache server. Content retrieval requests of the group of users who are close to the cache server are first directed to the cache server.

When the cache server gets such retrieve request from a user, the cache server first checks whether there is a copy of the latest content in the cache server. If the cache server has a copy of the latest content, then the latest content is delivered to the user. If however, he cache server does not have a copy of the latest content, the cache server secures the latest content from the remote server which has the latest content. The latest content is then cached in the cache server and also delivered to the user. Further details of cache server and remote server configurations may be found in U.S. Pat. Nos. 5,940,594 and 7,552,220.

SUMMARY OF THE PREFERRED EMBODIMENTS

Provided are a method, a system, a storage controller, and a computer program product in which a controller receives a request from a user to store content in a target node of a plurality of nodes. A determination is made of a preferred node for the user, from a repository that maintains a correspondence between the user and the preferred node for storing the content for the user, wherein the preferred node is included in the plurality of nodes. Responsive to determining that the determined preferred node is the target node, the controller transmits the request from the user to store the content, to the preferred node. Responsive to determining that the determined preferred node is not the target node, the controller transmits the request and an identification of the target node to the preferred node.

In certain embodiments, the preferred node in response to receiving the request from the controller performs: responsive to determining that the preferred node is the target node, storing the content in the preferred node; responsive to determining that the preferred node is not the target node, transferring the content to the target node and storing the content in the cache of the preferred node while transferring the content to the target node.

In additional embodiments, the preferred node is more proximate to the user for processing commands from the user, in comparison to other nodes of the plurality of nodes.

In further embodiments, the user is a first user, and the preferred node of the first user is different from a preferred node of a second user.

In yet further embodiments, the plurality of nodes supports an access interface for updating and accessing the content, and the plurality of nodes comprises a content management system supporting database management system (DBMS) transactions.

In yet further embodiments, the content includes data or objects, and the creating, reading, updating, and deleting of the content is performed in the plurality of nodes.

In further embodiments, the controller comprises a controller application that executes in a content management system comprising the plurality of nodes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide mechanisms to maintain in a repository a correspondence between a user and a preferred node for storing the content for the user. A controller receives a request from a user to store content in a target node of a plurality of nodes and determines the preferred node of the user from the repository. If the target node is the preferred node, the controller transmits the request from the user to store the content, to the preferred node. If the target node is not the preferred node, the controller transmits the request and an identification of the target node to the preferred node, and the preferred node transfers the content to the target node and stores the content in the cache of the preferred node while transferring the content to the target node.

Figure 1:
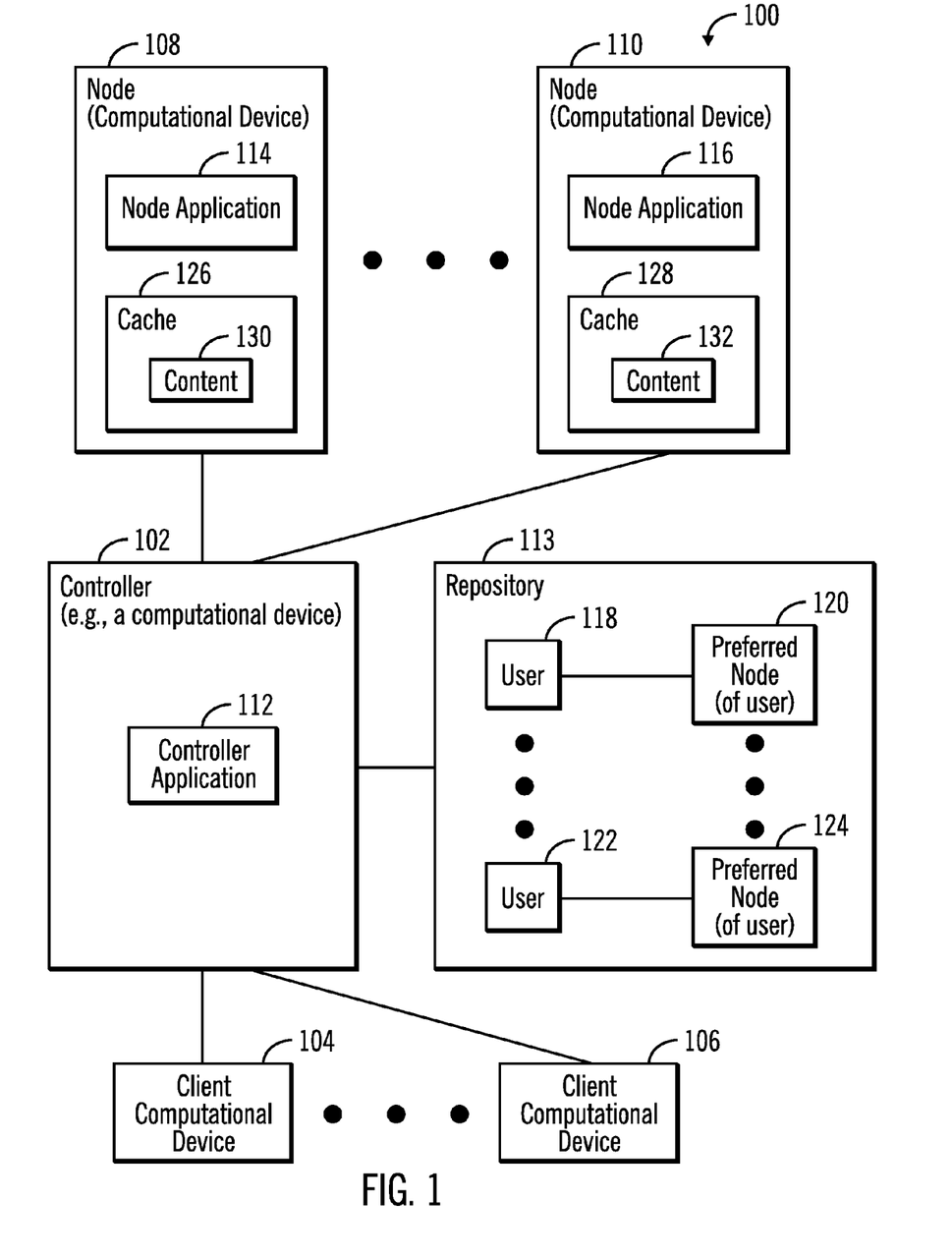
FIG. 1 illustrates a block diagram of a computing environment comprising a controller coupled to client computational devices, nodes, and a repository in accordance with certain embodiments.

FIG. 1 illustrates a block diagram of a computing environment 100 comprising a controller 102 coupled to a plurality of client computational devices 104, 106, a plurality of nodes 108, 118, and a repository 113, in accordance with certain embodiments.

The controller 102, the nodes 108, 110, and the client computational devices 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The controller 102, the nodes 108, 110, the client computational devices 104, 106, and the repository 113 may elements in any suitable network, such as, a storage area network, a wide area network, the Internet, an intranet. In certain embodiments, the controller 102, the nodes 108, 110, the client computational devices 104, 106, and the repository 113 may be elements in a cloud computing environment.

A controller application 112 executes in the controller 102, and node applications 114, 116 execute in the nodes 108, 110. The controller application 112 and the node applications 114, 116 may be implemented in software, hardware, firmware or any combination thereof. In certain embodiments, the controller application 112 executes in a content management system comprising the plurality of nodes 108, 110.

In FIG. 1, the repository 113 stores an indication of the preferred node of users. For example, the preferred node for storing content for user 118 is shown to be the preferred node 120, and the preferred node for storing content for user 122 is shown to be the preferred node 124. In certain embodiments, the preferred nodes of different users may be different. For example, if there is a first user and a second user, then in certain embodiments, the preferred node of the first user is different from a preferred node of a second user. It is of course possible for two different users to have the same preferred node.

In certain embodiments, the preferred node of a user is more proximate to the user for processing commands from the user, in comparison to other nodes of the plurality of nodes. In other words, the preferred node of a user is likely to be accessible in a lesser amount of time than other nodes to process commands received from a user via the client computational devices 104, 106, at the controller 102.

While the repository 113 is shown outside the controller 102, in certain embodiments a storage device that stores the repository 113 may be included within the storage controller 102.

The nodes 108, 110 each include a cache 126, 128 that may store content 130, 132. The cached content stored in the nodes 108, 110 may be made available users who access the content from the client computational devices 104, 106 via the controller 102. The plurality of nodes 108, 110 may support an access interface for updating and accessing content, and the plurality of nodes may in certain embodiments support a content management system supporting database management system (DBMS) transactions. In certain embodiments, the content stored in the plurality of nodes 108, 110 includes data or objects, and the creating, reading, updating, and deleting of the content is performed in the plurality of nodes 108, 110.

Therefore, FIG. 1 illustrates certain embodiments in which a repository 113 stores the preferred node for storing data for users. The users store and access data stored in nodes 108, 110 via the controller 102.

Figure 2:
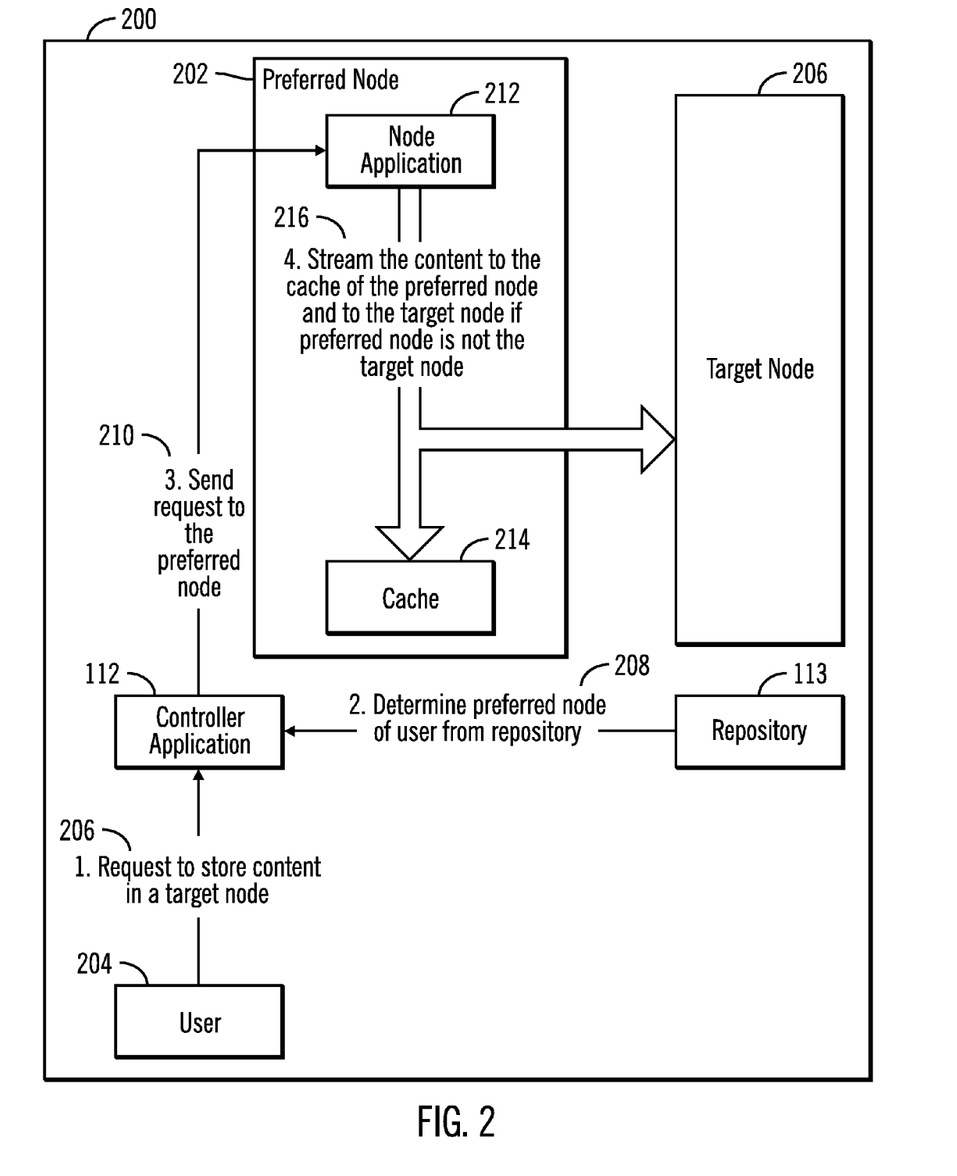
FIG. 2 illustrates a block diagram that shows operations performed by a controller application in the controller and a preferred node, in accordance with certain embodiments.

FIG. 2 illustrates a block diagram 200 that shows operations performed by the controller application 112 in the controller 102, and a preferred node 202, in accordance with certain embodiments.

A user 204 may send a request (shown via reference numeral 206) from a client computational device 104 to the controller application 112. The request may be to store content in a target node 206 that is one of the plurality of nodes 108, 110 shown in FIG. 1. In certain embodiments, the content includes data or objects, and the creating, reading, updating, and deleting of the content is performed in the plurality of nodes 108, 110.

The controller application 112 receives the request from the user 204 and determines (shown via reference numeral 208) the preferred node of the user 204. For example, it may be determined that the preferred node of the user 204 is the node 202.

The controller application 112 then sends (shown via reference numeral 210) the request to the preferred node 202. The node application 212 of the preferred mode receives the request and streams the content to the cache 214 of the preferred node and to the target node 206 (as shown via reference numeral 216) if the preferred node of the user is different from the target node in which the user wants to store the content.

Therefore, FIG. 2 illustrates certain embodiments in which the preferred node 202 of a user streams content to the target node 206 designated by a user 204, if the target node designated by the user is different from the preferred node of the user as determined from the repository 112.

Figure 3:
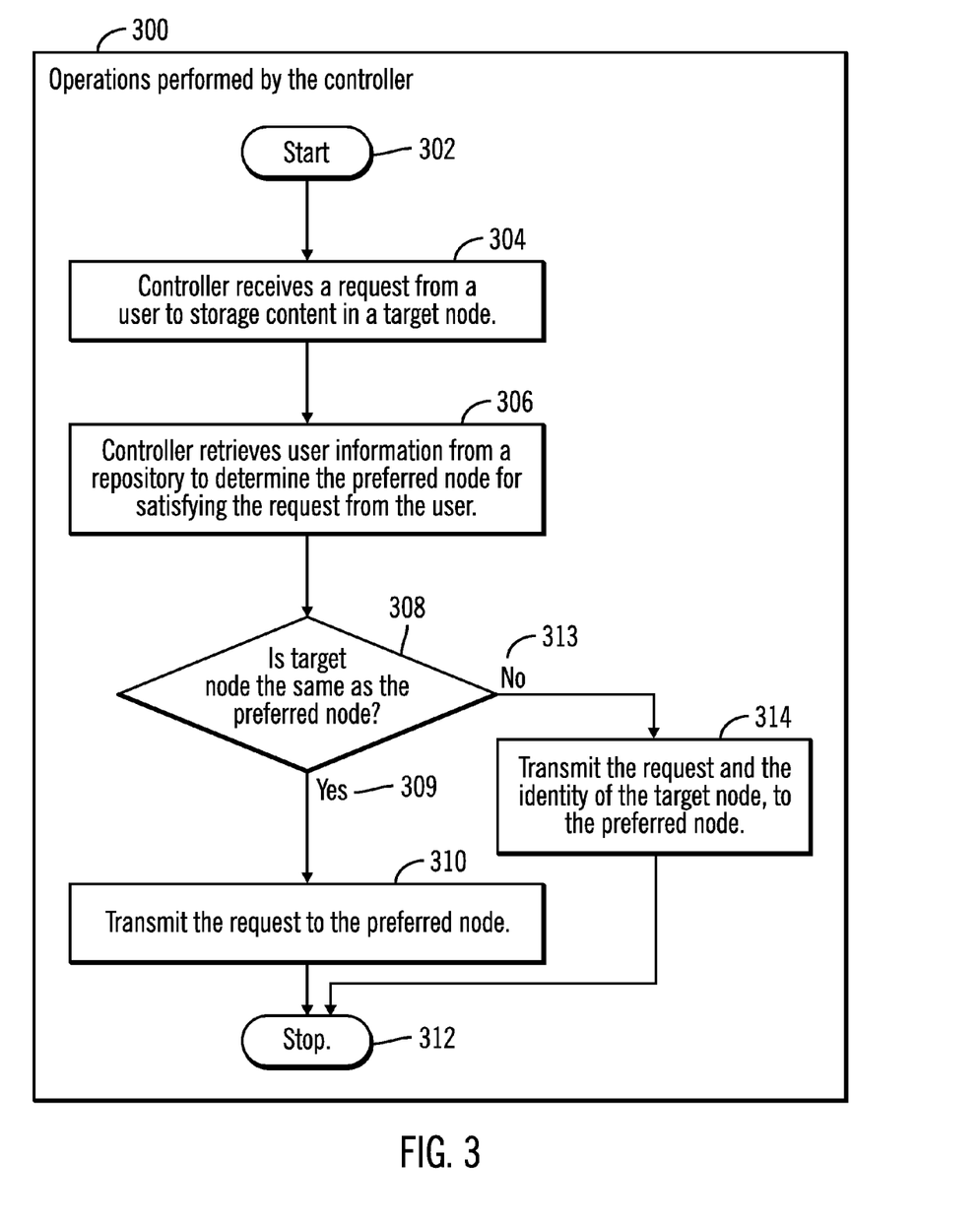
FIG. 3 illustrates a block diagram that shows operations performed by the controller, in accordance with certain embodiments.

FIG. 3 illustrates a block diagram 300 that shows operations performed by the controller 102, in accordance with certain embodiments. The controller application 112 that executes in the controller 102 may perform the operations shown in FIG. 3.

Control starts (reference numeral 302) and proceeds to block 304 in which the controller 102 receives a request from a user to store content in a target node. The controller retrieves (at block 306) the user information from the repository 112 to determine the preferred node for satisfying the request form the user.

Control then proceeds to block 308 in which the controller 102 determines whether the target node is the same as the preferred node. If so ("Yes" branch 309 from block 308) then control proceeds to block 310 in which the controller 102 transmits the request to the preferred node and the process stops (at block 312).

If at block 308 the controller 102 determines that the target node is not the same as the preferred node ("No" branch 313 from block 308) then control proceeds to block 314 in which the controller 102 transmits the request and the identity of the target node to the preferred node and the process stops (at block 312).

Therefore FIG. 3 illustrates operations performed by the controller 102 in response to a request to write content (e.g., data) received from a user, where the request also designates a target node to which the content is to be written.

Figure 4:
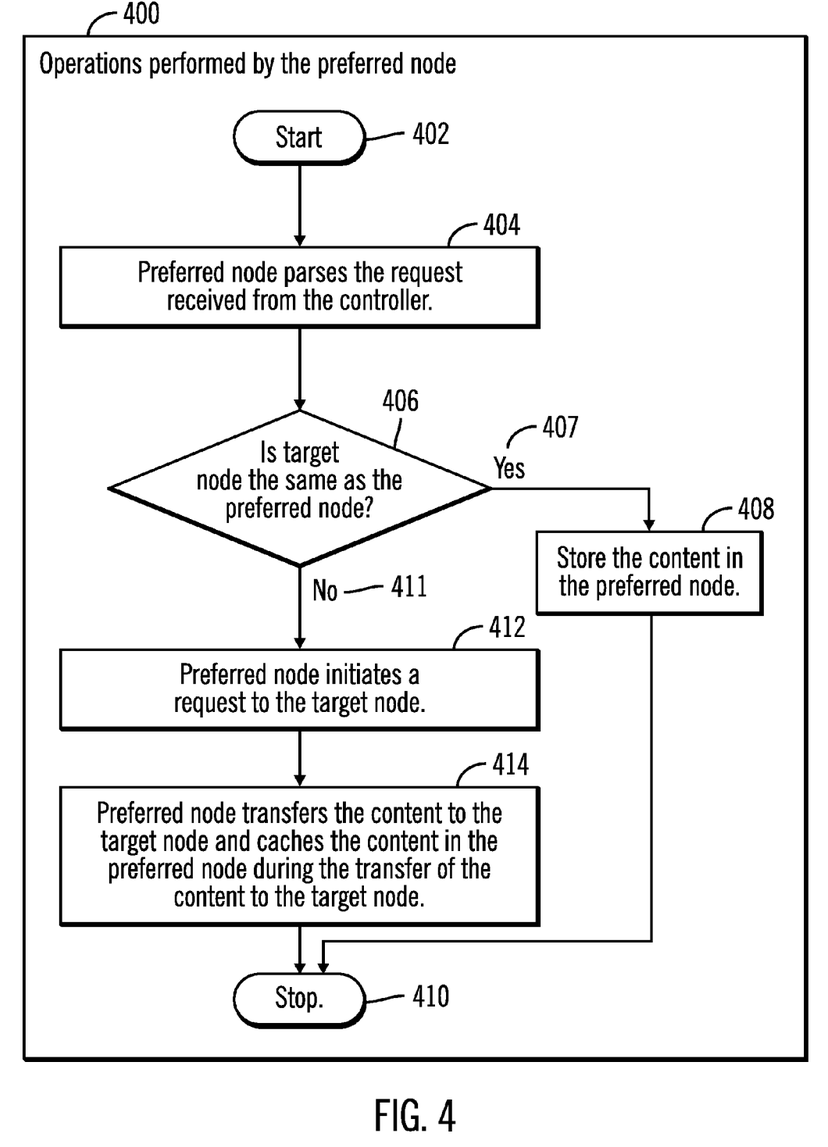
FIG. 4 illustrates a block diagram that shows operations performed by the preferred node, in accordance with certain embodiments.

FIG. 4 illustrates a block diagram 400 that shows operations performed by the preferred node 202, in accordance with certain embodiments. The operations shown in FIG. 4 may be performed by the node application 212 of the preferred node 202.

Control starts at block 402 and proceeds to block 404 in which the preferred node 202 parses the request received from the controller 102. Control proceeds to block 406 in which the preferred node 202 determines whether the target node is the same as the preferred node. If so ("Yes" branch 407), control proceeds to block 408 in which the content is stored in the preferred node 202 and the process stops (at block 410).

If at block 404, the preferred node 202 determines that the target node is not the same as the preferred node ("No" branch 411), then the preferred node 202 initiates (at block 412) a request to the target node 206, and then transfers (at block 414) the content to the target node 206 and caches the content in the preferred node 202 during the transfer of the content to the target node 206. Subsequently, the process stops (at block 410).

Therefore FIG. 4 illustrates operations performed by the preferred node 202 of a user in response to a forwarding of the request of the user from the controller 102 to the preferred node 202 of the user.

Figure 5:
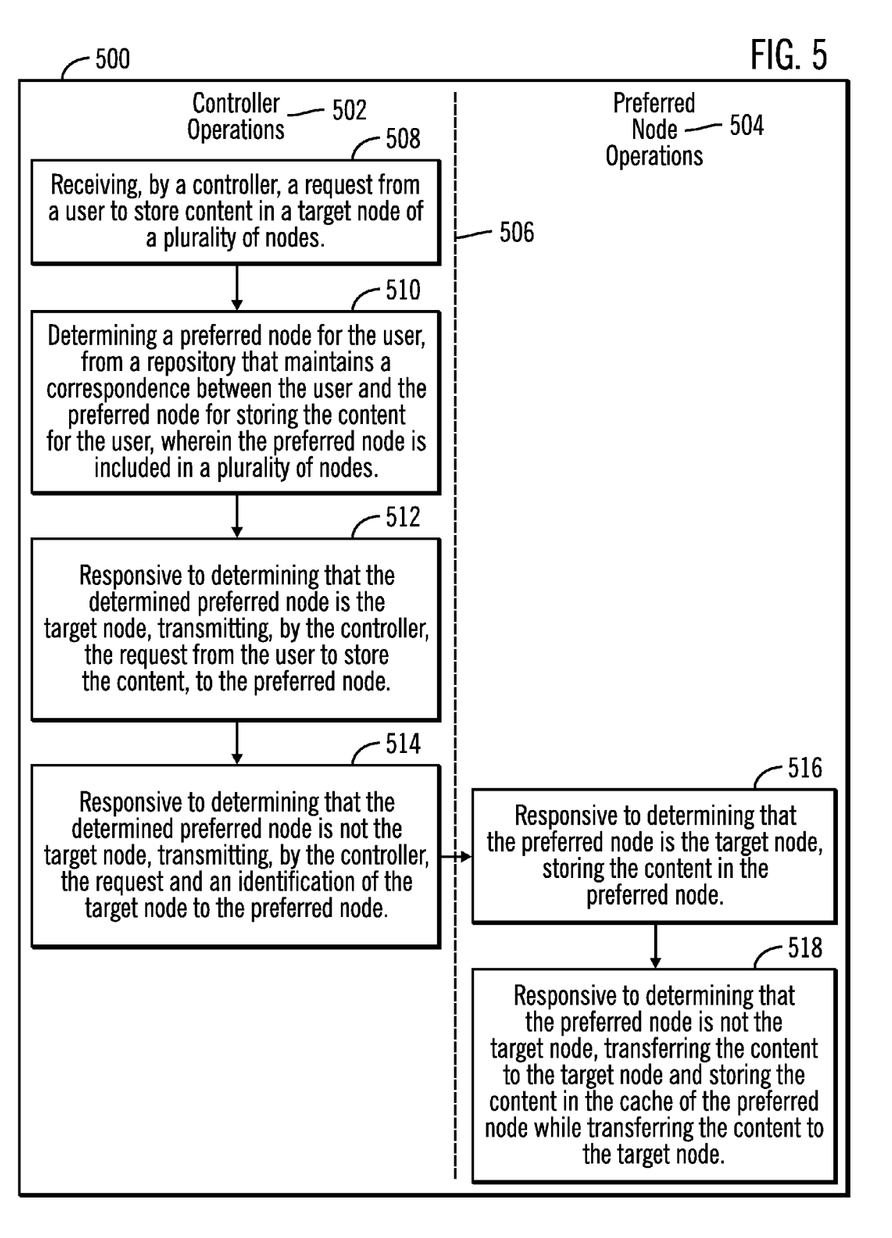
FIG. 5 illustrates a flowchart that shows operations performed by the controller and the preferred node, in accordance with certain embodiments.

FIG. 5 illustrates a flowchart 500 that shows operations performed by the controller 102 and the preferred node 202, in accordance with certain embodiments. The operations shown to the left of the dashed line 506 are controller operations 502 and the operations shown to the right of the dashed line 506 are the preferred node operations 504.

Control starts at block 508 in which a controller 102 receives a request from a user to store content in a target node of a plurality of nodes 108, 110. A determination is made (at block 510) of a preferred node for the user, from a repository 112 that maintains a correspondence between the user and a preferred node for storing the content for the user, wherein the preferred node is included in a plurality of nodes 108, 110.

From block 510 control proceeds to block 512 in which in which responsive to determining that the determined preferred node is the target node, the controller 102 transmits the request from the user to store the content, to the preferred node 202. Control proceeds to block 514, in which responsive to determining that the determined preferred node is not the target node, the controller 102 transmits the request and an identification of the target node to the preferred node 202.

From block 514 control proceeds to block 516 in which the preferred node in response to receiving the request from the controller performs operations shown via reference numerals 516, 518. At block 516, responsive to determining that the preferred node is the target node, the preferred node 202 stores the content in the preferred node. At block 518, responsive to determining that the preferred node is not the target node, the preferred node 202 transfers the content to the target node 206 and stores the content in the cache 214 of the preferred node 202 while transferring the content to the target node 206.

Therefore, FIGS. 1-5 illustrates certain embodiments in which a repository stores the indication of a preferred node for a user. If a user designates a target node for storing content and the target node is the preferred node indicated by the repository, then content is stored in the preferred node. Otherwise, the request from the user is sent by the controller to the preferred node and then the preferred node streams the content to the target node.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
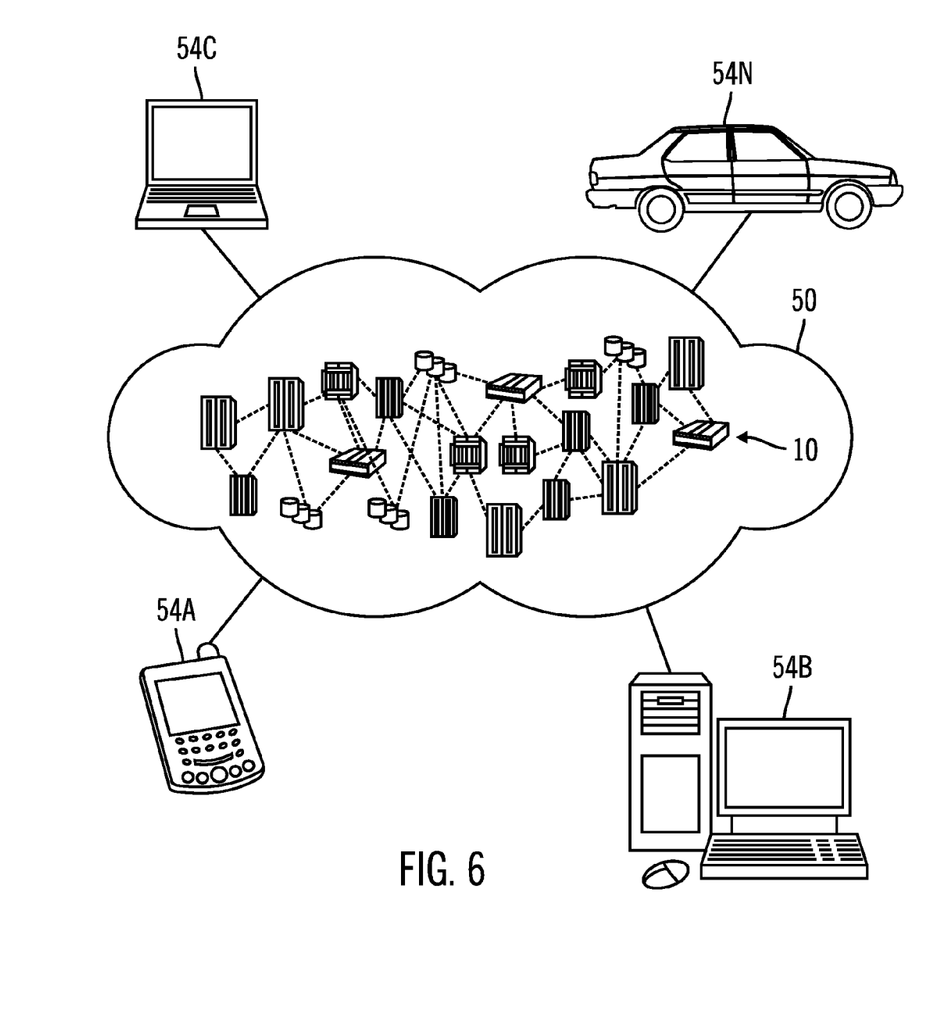
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
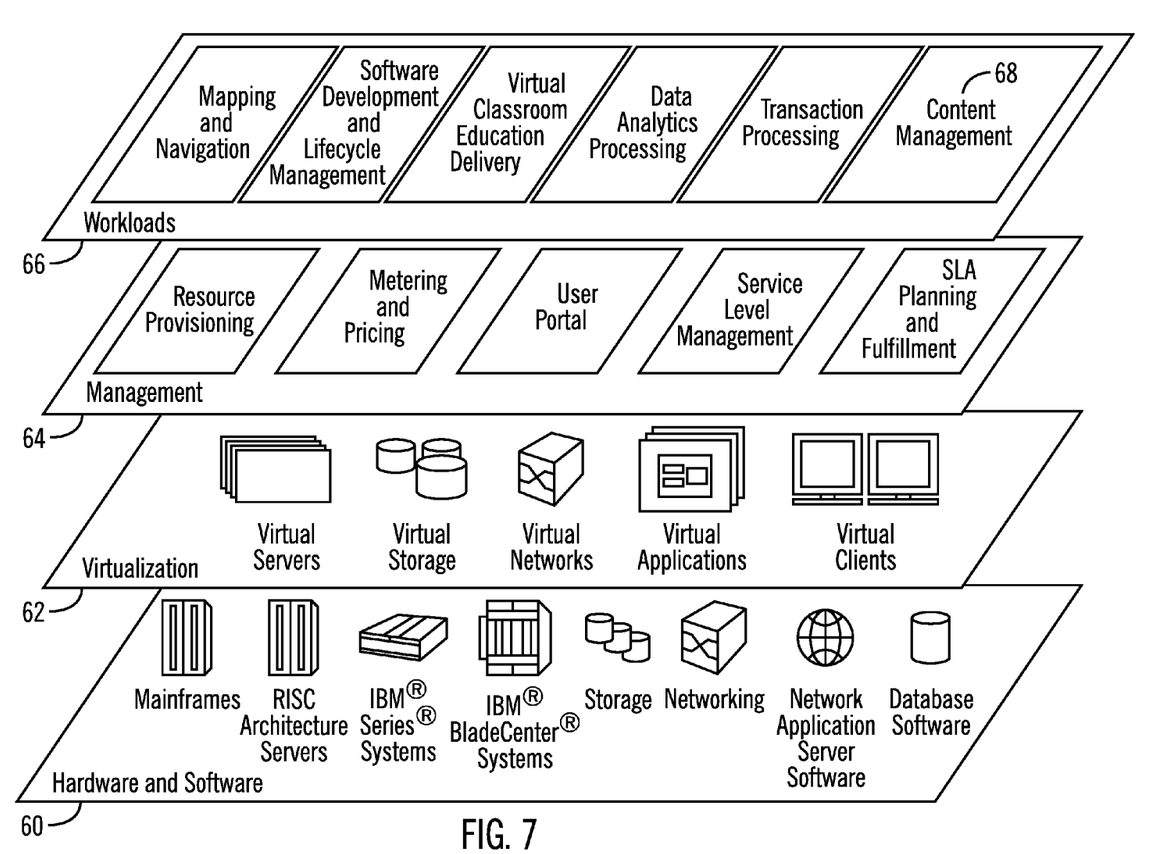
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the content management 68 (e.g., in the controller application 112 and the node applications 114, 116) as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
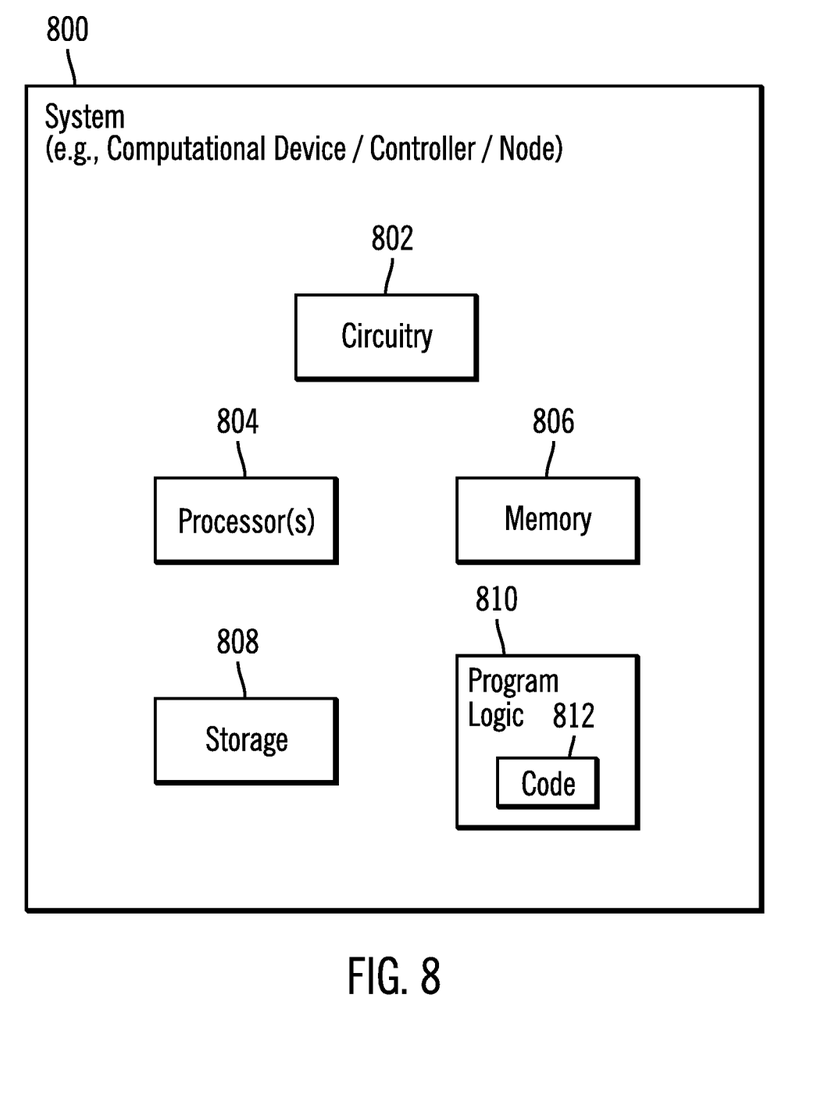
FIG. 8 illustrates a block diagram of a computational system that shows certain elements that may be included in the controller or the nodes shown in FIG. 1, in accordance with certain embodiments.

FIG. 8 illustrates a block diagram that shows certain elements that may be included in the controller 102 or the nodes 108, 110 in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
receiving, by a controller, a request from a user to store content in a target node of a plurality of nodes, wherein the target node is indicated in the request from the user;
in response to receiving the request, determining, by the controller from a repository that maintains a correspondence between the user and a preferred node for storing the content for the user, the preferred node for the user, wherein the preferred node is included in the plurality of nodes;
determining, by the controller, whether the determined preferred node is the target node indicated in the request from the user;
responsive to determining by the controller that the determined preferred node is the target node, transmitting, by the controller, the request from the user to store the content, to the preferred node, wherein in response to receiving the transmitted request from the controller, the preferred node stores the content in the preferred node; and
responsive to determining by the controller that the determined preferred node is not the target node, transmitting, by the controller, the request and an identification of the target node to the preferred node, wherein in response to receiving the transmitted request and the identification of the target node from the controller, the preferred node initiates a request to the target node and transfers the content to the target node.

2. The method of claim 1, wherein:
the preferred node is more proximate to the user for processing commands from the user, in comparison to other nodes of the plurality of nodes.

3. The method of claim 2, wherein the user is a first user, and wherein the preferred node of the first user is different from a preferred node of a second user.

4. The method of claim 1, wherein:
the plurality of nodes supports an access interface for updating and accessing the content; and
the plurality of nodes comprises a content management system supporting database management system (DBMS) transactions.

5. The method of claim 1, wherein the content includes data or objects, and wherein creating, reading, updating, and deleting of the content is performed in the plurality of nodes.

6. The method of claim 1, wherein the controller comprises a controller application that executes in a content management system comprising the plurality of nodes.

7. A system, comprising:
a memory; and
a processor coupled to the memory, wherein the processor performs operations, the operations comprising:
receiving a request from a user to store content in a target node of a plurality of nodes, wherein the target node is indicated in the request from the user;
in response to receiving the request, determining, from a repository that maintains a correspondence between the user and a preferred node for storing the content for the user, the preferred node for the user, wherein the preferred node is included in the plurality of nodes;
determining whether the determined preferred node is the target node indicated in the request from the user;
responsive to determining that the determined preferred node is the target node, transmitting the request from the user to store the content, to the preferred node, wherein in response to receiving the transmitted request, the preferred node stores the content in the preferred node; and
responsive to determining that the determined preferred node is not the target node, transmitting, the request and an identification of the target node to the preferred node, wherein in response to receiving the transmitted request and the identification of the target node, the preferred node initiates a request to the target node and transfers the content to the target node.

8. The system of claim 7, wherein the system is a controller.

9. The system of claim 8, wherein:
the preferred node is more proximate to the user for processing commands from the user, in comparison to other nodes of the plurality of nodes.

10. The system of claim 9, wherein the user is a first user, and wherein the preferred node of the first user is different from a preferred node of a second user.

11. The system of claim 8, wherein:
the plurality of nodes supports an access interface for updating and accessing the content; and
the plurality of nodes comprises a content management system supporting database management system (DBMS) transactions.

12. The system of claim 8, wherein the content includes data or objects, and wherein creating, reading, updating, and deleting of the content is performed in the plurality of nodes.

13. The system of claim 8, wherein the system is a controller that comprises a controller application that executes in a content management system comprising the plurality of nodes.

14. A computer program product, the computer program product comprising a computer readable storage medium having computer readable program code embodied therewith, the computer readable program code configured to perform operations, the operations comprising:
receiving, by a controller, a request from a user to store content in a target node of a plurality of nodes, wherein the target node is indicated in the request from the user;
in response to receiving the request, determining, by the controller from a repository that maintains a correspondence between the user and a preferred node for storing the content for the user, the preferred node for the user, wherein the preferred node is included in the plurality of nodes;
determining, by the controller, whether the determined preferred node is the target node indicated in the request from the user;
responsive to determining by the controller that the determined preferred node is the target node, transmitting, by the controller, the request from the user to store the content, to the preferred node, wherein in response to receiving the transmitted request from the controller, the preferred node stores the content in the preferred node; and
responsive to determining by the controller that the determined preferred node is not the target node, transmitting, by the controller, the request and an identification of the target node to the preferred node, wherein in response to receiving the transmitted request and the identification of the target node from the controller, the preferred node initiates a request to the target node and transfers the content to the target node.

15. The computer program product of claim 14, wherein:
the preferred node is more proximate to the user for processing commands from the user, in comparison to other nodes of the plurality of nodes.

16. The computer program product of claim 15, wherein the user is a first user, and wherein the preferred node of the first user is different from a preferred node of a second user.

17. The computer program product of claim 14, wherein:
the plurality of nodes supports an access interface for updating and accessing the content; and
the plurality of nodes comprises a content management system supporting database management system (DBMS) transactions.

18. The computer program product of claim 14, wherein the content includes data or objects, wherein creating, reading, updating, and deleting of the content is performed in the plurality of nodes, and wherein the controller comprises a controller application that executes in a content management system comprising the plurality of nodes.

* * * * *